United States Patent Office 3,350,350
Patented Oct. 31, 1967

3,350,350
METHOD FOR PREPARING POLYSILARYLENE-POLYSILOXANE COPOLYMERS
Siegfried Nitzsche and Paul Buchheit, Burghausen, Upper Bavaria, Germany, assignors to Wacker-Chemie G.m.b.H., Munich, Germany
No Drawing. Filed Mar. 7, 1966, Ser. No. 532,077
Claims priority, application Germany, Mar. 8, 1965, W 38,707
16 Claims. (Cl. 260—46.5)

This invention relates to a novel method for preparing silarylene-siloxane copolymers and more particularly silarylene-siloxane block copolymers.

Copolymers of siloxane and silarylenes characterized in that some of the silicon atoms are joined through Si-O-Si linkages and others through Si-phenylene-Si linkages have aroused great interest in the silicone field. Such polymers have structures such that the physical properties of the products prepared therefrom are significantly different from the physical properties displayed by the siloxanes and/or siloxane-silalkylene polymers heretofore known.

However, methods of preparation of the polysilarylenesiloxanes have not been satisfactory. These polymers have been prepared by hydrolyzing silarylenesilanes having hydrolyzable substituents and condensing the hydrolyzates thus obtained. This has not been a satisfactory procedure because the silarylenesilanes are difficult to prepare and the silarylenesilanes are produced in low yield thus increasing the cost of the ultimate product.

Further, the most desired of the polysilarylene-siloxane copolymers are the block copolymers which can be used for preparation of elastomers. These block copolymers are linear in nature and contain segments or blocks of silarylene units and blocks of siloxane units. These block copolymers have required carefully controlled and expensive methods of preparation in order to minimize the formation of random copolymers wherein the individual silphenylene and siloxane units are statistically or randomly distributed through the molecule.

Accordingly, it is the primary object of this invention to introduce a novel method for preparing silarylene-siloxane block copolymers in high yield. A further object is a simple method for preparing block copolymers of silarylene blocks and siloxane blocks in commercially acceptable yields at commercially acceptable cost in time, effort and money. Other objects and advantages of this invention are detailed in or will be apparent from the disclosure and claims following.

This invention is a method for preparing silarylene-siloxane copolymers comprising reacting (I) at least one organosiloxane containing at least two silicon bonded chlorine atoms per molecule and composed of units of the general formula $R'_xCl_ySiO_{4-x-y/2}$ where $R'$ is a substituent selected from the group consisting of hydrogen, monovalent hydrocarbon radicals and monovalent substituted hydrocarbon radicals wherein the substituents are inert to magnesium, $x$ is 0, 1, 2 or 3, $y$ is 0, 1, 2 or 3 and the sum of $x+y$ does not exceed 3, at least 70 percent of the $R'$ substituents present being monovalent hydrocarbon radicals, (II) at least one arylene halide of the general formula XRX where R is an arylene radical, X is a halogen atom, and the halogens are bonded in para position, (III) at least one dichlorosilane of the general formula $R''_2SiCl_2$ where each $R''$ is a hydrogen atom, a monovalent hydrocarbon radical or a substituted hydrocarbon radical as defined for $R'$, at least one $R''$ in each molecule being a monovalent hydrocarbon radical, and (IV) magnesium. A further aspect of this invention contemplates the hydrolysis of the product of the above reaction and further condensation to produce larger siloxane molecules.

The organochlorosiloxanes employed as reactant (I) herein are prepared by well known methods. The simplest of such siloxanes are the alpha, omega, chloro-diorganosiloxanes defined by the general formula $$Cl(R'_2SiO)_nSiR'_2Cl$$

where $n$ is an integer, preferably 1–500 and $R'$ is a monovalent hydrocarbon radical, preferably methyl, vinyl or phenyl and most preferably methyl. The linear, chlorine endblocked diorganosiloxane polymers defined by the foregoing formula can be modified by the presence of $R'SiO_{3/2}$, $ClSiO_{3/2}$, $R'ClSiO$, $SiO_2$, $Cl_2SiO$, $Cl_2R'SiO_{1/2}$, $Cl_3SiO_{1/2}$ and $R'_3SiO_{1/2}$ units if desired but the most useful polymers to date are those wherein the R'/Si ratio is in the range from 1.9/1 to 2.0/1.

Thus the operative chloroorganosiloxanes employed herein can be siloxane homopolymers and copolymers as well as mixtures thereof but the preferred siloxane reactant is an essentially diorganosiloxane polymer having a chlorine atom bonded to each terminal silicon atom. Preferably the chloroorganosiloxane does not contain over 500 silicon atoms per molecule but higher polymers are operative herein though at a relatively slow rate of reaction.

The siloxanes employed herein can have hydrogen atoms bonded to silicon but it is preferred to have no more than one hydrogen bonded to any one silicon atom in the molecule hence it is preferred to have the ratio of H/Si not greater than 1/1. By far the most preferred siloxane reactant is $Cl[(CH_3)_2SiO]_nSi(CH_3)_2Cl$ wherein $n$ is 1–500.

The reactant (II) is a para-arylene dihalide of the general formula XRX. In this formula, R is an arylene radical, a monovalent hydrocarbon substituted arylene radical or a monovalent hydrocarbonoxy substituted arylene radical. Examples of the radicals represented by R include methylphenylene, ethylphenylene, n-propylphenylene, isopropylphenylene, n-, sec- and tert.-butylphenylene, methoxyphenylene, ethoxyphenylene, n-propoxyphenylene, isopropoxyphenylene, n-, sec- and tert.-butoxyphenylene, 4,4'-biphenylene, 4,4'-diphenyleneether, 4,4'-diphenylenemethane and 4,4'-diphenylenepropane (2,2) radicals. The halogen atoms represented by X are bonded to the arylene radical in para-positions and can be F, Cl, Br, I or At but are preferably chlorine or bromine. Particularly useful as reactant (II) is p-dibromobenzene, mixtures of arylene halides can be used if desired.

The arylene halide is employed in proportions of from 3 to 200 mols of arylene halide per mol of chloroorganosiloxane (I) present in the reaction mixture. It is economically unsound to employ more than 200 mols of (II) per mol of (I) and best results are achieved with at least 5 mols of (II) per mol of (I) in the reaction.

The organodichlorosilane (III) is represented by the general formula $R''_2SiCl_2$. The $R''$ substituents are similar in scope to the $R'$ substituents in the siloxane reactant (I). Thus $R''$ and $R'$ can be alkyl radicals such as methyl, ethyl, propyl, octyl, and myricyl, aryl radicals such as phenyl, diphenyl, naphthyl and anthracyl, alkaryl radicals such as tolyl, xylyl, ethylphenyl, and methylnaphthyl, aralkyl radicals such as benzyl and phenylethyl, cycloaliphatic radicals such as cyclopropyl, cyclobutyl, cyclohexyl, cyclohexenyl, cyclopentyl and cyclopentenyl, and alkenyl such as vinyl, allyl and octadecenyl as well as hydrogen atoms and substituted derivatives of the named monovalent hydrocarbon radicals wherein the substituents are not reactive with Mg as specifically exemplified by derivatives having oxygen atoms present as either linkages as in $CH_3OCH_2-$, $CH_3CH_2OCH_2CH_2-$, $CH_3(OCH_2CH_2)_3OCH_2CH_2-$ and $$CH_3(OCH_2CH_2CH_2)_2(OCH_2CH_2)_3OCH_2CH_2-$$

It is preferred that not more than one R″ per molecule represents a hydrogen atom thus $H_2SiCl_2$ is not a favored reactant though it is operative. Preferred are those silanes wherein one R″ is an alkyl radical of less than seven carbon atoms, most preferably methyl, a phenyl radical, or a vinyl radical and the other R″ is methyl, phenyl, vinyl or hydrogen. Best known and most widely employed herein are methylhydrogen dichlorosilane and dimethyldichlorosilane. Of course, mixtures of the defined silanes can be employed.

The organodichlorosilane (III) is preferably employed in proportions established by the equation $d=p-a$ (Eq. 1) where $d$ is the number of mols of organodichlorsilane (III) employed, $p$ is the number of mols of arylene halide (II) employed and $a$ has a value in the range from 0 to twice the number of chlorine equivalents in the amount of organosiloxane (I) employed. Equation I permits the presence of at most 1 mol of (III) per mol of (II). The minimum proportion of reactant (III) permitted under Equation 1 is established by determining the number of mols of (II) present and subtracting twice the number of chlorine equivalents present in siloxane (I). Best results are achieved when the proportion of organodichlorosilane (III) employed is established by formula $d=p-a'$ (Equation 2) where $d$ and $p$ are as above defined and $a'$ represents the number of mols of organosiloxane (I) employed or one-half of the chlorine equivalents present in the amount of organosiloxane (I) employed.

The magnesium (IV) is used in the form of metal, expediently in forms with a large surface, i.e., in the shape of chips, kernels or powder. The magnesium is preferably used in a minimum quantity to be obtained from the equation:

$$m = h/2 - b$$

In this equation $m$ represents the number of mols of magnesium, $h$ is the number of halogen equivalents in the reaction components (I), (II), (III) and $b$ has a value from 0 to $z$ so that the size of the molecules increases with the decreasing values of $b$. Preferably the magnesium is used in a quantity of $h/2$. Magnesium can be used in quantities exceeding $h/2$; no advantage, however, is to be gained by using magnesium exceeding the quantity of $h$. The reaction follows the mixing of the reaction components (I), (II), (III) and (IV).

The concurrent use of solvents which are inert to the reaction components is effective in ameliorating the reaction of the method according to the present discovery. For this, those materials which are commonly incorporated as inert solvents during the reaction of metals with organohalogen compounds, especially, ethers such as diethyl ether, di-n-butyl ether and tetrahydrofuran, as well as toluene and xylene, can be used. Mixtures of solvents can be also used.

Preferably the method of the present discovery is carried out at 15–150° C. and normal pressure. If desired, higher or lower pressure can also be used. Expediently the method of the present discovery is carried out in an atmosphere which is inert toward the reaction components, i.e., especially by excluding the water vapor and the oxygen which is contained in the air.

Preferably the method of the present discovery is carried out in one step, i.e., the organosiloxane, organodichlorosilane and at least 90 mol percent of the arylene halide which is incorporated are allowed to react with the magnesium at the same time, while previously the proportion of arylene halide making a difference to 100 mol percent was used to activate the magnesium. If desired, the method of the present discovery can, however, be carried out in two stages. According to a preferred method of execution of the 2-stage process, arylene halide is allowed to react in the first stage with $p-a'$ mol organodichlorosilane and $h/2-b$ mol magnesium, wherein $p$ is always as above defined and $a'$ is $0.1z$ to $0.5z$. After this reaction has terminated, which may be recognized when the quantity of metal remains constant, the reaction mixture thus obtained is mixed in the second stage with $z$ mols of organosiloxane which contain Si-bonded chlorine atoms without previously isolating organic, magnesium-free components, and the reaction is allowed to go to completion.

When using the diorganosiloxanes (I) containing a chlorine atom in each of the two terminal units as defined by the Formula 1, above, the product is a polysilarylenesiloxane of the Formula 2:

$$-[(SiR'_2O)_nSiR''_2(RSiR''_2)_xR]-_{z'} \qquad (2)$$

In this formula $z'$ represents a whole number of at least 1, $x$ is a whole number of at least 1, wherein the average value of $x$ could be approximately equal to the ratio of the incorporated mol quantity of arylene halide to the incorporated mol quantity of diorganosiloxane, and R, R′ and R″ as well as $n$ are as above defined.

When the two free valences which are shown in the above formula by horizontal lines outside of the brackets are not satisfied among each other by a closed ring, then they may be satisfied as follows:

The free valence belonging to the outer left silicon atom may be satisfied by a chlorine atom or by a group of the general formula $$-(RSiR''_2)_{x'}R(SiR''_2)_yX'$$

wherein $x'$ is 0 or a whole number and $y$ is 0 or 1 and X′ is the same as X, when $y$ is 0, or a chlorine atom when $y$ is 1.

The free valence belonging to the outer right R radical may be satisfied by an X halogen atom or by a group of the general formula $$-SiR''_2Cl$$

or by a group of the general formula $$-(SiR'_2O)_nSiR'_2Cl$$

These different possibilities of satisfying the two free valences of Formula 2 are dependent in part on the values of $a$ in Eq. 1 and $b$ in Eq. 3 as well as on whether a single stage or a double stage process has been used. In the following table, a survey is given showing how such functions may be viewed (the above Formula 2 is abbreviated to "(—(2)—)"):

TABLE

| Number of Stages | $a$ in Eq. 1 | $b$ in Eq. 3 | Product |
|---|---|---|---|
| 1 | $z$ | 0 | Rings of ; very high values for chains displaying $z$ of compounds of the same formula as in the following line. |
| 1 | $z$ | Above 0 and including $z$ | Cl-(2)-X;  XR-(2)-SiR″$_2$Cl;  ClSiR-(2)-X;  XRSiR″$_2$R-(2)-SiR″$_2$Cl;  ClSiR″$_2$R-(SiR″$_2$R)$_{x'}$-(2)-X; XR-(2)-(SiR'$_2$O)$_n$SiR'$_2$ClXR(SiR″$_2$R)$_{x'}$-(2)-(SiR'$_2$O$_n$)-SiR'$_2$Cl. |
| 1 | Any value under $z$ to 0 inclusive. | do 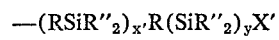 | Cl-(2)-SiR″$_2$Cl;  ClSiR″$_2$R-(2)-SiR″$_2$Cl;  ClSiR″$_2$R-(2)-SiR″$_2$Cl;  ClSiR″$_2$R-(2)-(SiR'2O)$_n$ SiR'2Cl; ClSiR″$_2$R(SiR″$_2$)$_{x'}$-(2)-(SiR'$_2$O)$_n$ SiR'$_2$Cl. |
| 2 | More than 0 and up to 0.5 $z$ inclusive. | do  | Cl-(2)-(SiR'$_2$O)$_n$SiR'2Cl. |
| 1 | More than $z$ up to $2z$ inclusive. | do 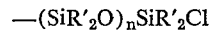 | XRSiR″$_2$R-(2)-X; XR-(2)-X; XR(SiR″$_2$R)$_{x'}$-(2)-X. |

Isolation of the products obtained from the reaction of chlorine-containing organosiloxane with arylenehalides, organodichlorosilanes and magnesium may take place in the same manner as in the isolation of the desired reaction products which are obtained from organometallic syntheses, especially Grignard syntheses. Preferably the reaction mixtures obtained from the reaction of chlorine-containing organosiloxanes and arylenehalides, organodichlorosilanes and magnesium are mixed with water at 0–20° C., where the pH of the mixture can be kept beneath 7 by the addition of an acid such as hydrochloric acid, if necessary. In treating the reaction mixture with water, the Si-bonded chlorine atoms which may be present are converted into hydroxyl groups by hydrolysis. However, the polysilarylenesiloxanes can be obtained by driving off the volatile components after removing the magnesium halides from the reaction mixtures as they appear during the preparation. The Si-bonded chlorine atoms which are present are then available as functional groups for further reactions.

The polysilarylenesiloxanes of the present discovery are viscously fluid to wax-like, colorless to light yellow masses.

Should the polysilarylenesiloxanes prepared as described above, contain no Si-bonded hydroxyl groups, but a content of such hydroxyl groups be desired, the Si-bonded hydroxyl groups can be introduced into the polysilarylenesiloxanes by splitting siloxane bonds, without affecting the silarylene blocks thereby. Procedures which are commonly applied in converting siloxane bonds into hydroxyl groups may be employed here. For example, a polysilarylenesiloxanes can be heated under pressure in a mixture with water and acids or bases according to the process described in United States Patent No. 2,779,776 issued January 1957, and Patent No. 2,863,897, issued December 1958, for ordinary organopolysiloxanes. Preferably, however, a method described in the copending patent application filed concurrently herewith under the title of "Method of Preparing Silarylenesilanols and Polysilarylene-Siloxanols," U.S. application Serial No. 532,094 filed Mar. 7, 1966, for introducing Si-bonded hydroxyl groups into the polysilarylenesiloxanes prepared according to the present discovery by splitting siloxane bonds is used. According to a preferred execution of this procedure, the polysilarylenesiloxanes are converted into polysilarylenesiloxanolates or polysilarylenesilanolates by reacting with at least 1 mol of aqueous and/or alcoholic alkali per mol of polysilarylenesiloxane oxygen in 8–14 N-solution at 15°–50° C. and then converted into the corresponding polysilarylenesiloxanols or polysilarylenesilanols by reacting the reaction mixture with an acid possessing a dissociation constant of at least $4 \cdot 10^{-7}$ in aqueous 0.1 N-solution at 25° C. For this, sodium hydroxide is preferably used as the alkali and hydrochloric acid as the acid. The conversion of the siloxanolates or silanolates into siloxanols or silanols preferably takes place at 0–50° C. especially at room temperature.

The polysilarylene siloxanes prepared according to the present discovery can be used as lubricants, mold release agents and dielectric media or, if desired, they can be converted into organopolysiloxane elastomers in the known manner by condensation or equilibrization with the diorganopolysiloxanes, for example dimethylpolysiloxanes having a viscosity of 100 to $10 \cdot 10^6$ cs./25° C., commonly used for preparing organopolysiloxane elastomers. The polysilarylenesiloxanes prepared according to the present discovery can also be condensed or equilibrated with organopolysiloxanes commonly used for the preparation of organopolysiloxane resins, especially those with units of the general formula $$R''''_rSiO_{4-r/2}$$

where $R''''$ is a monovalent, substituted if desired hydrocarbon radical, especially methyl, phenyl, and vinyl radical and $r$ is an average of 0.9 to 1.8, or reacted with such siloxanes by attaching Si-bonded hydrogen to aliphatic multiple bonds. If the polysilarylenesiloxanes prepared according to the present discovery still contain carbon-bonded halogen, this can be used for any reactions known for such a halogen. The following examples are included herein to assist those skilled in the art in understanding and practicing this invention. The scope of the invention is not delineated by the examples but is set forth in the appended claims. All parts are by weight unless otherwise stated. The measures described in the following examples are always carried out at room temperature, i.e., at about 20° C. or without external application of heat, with the exception of distilling off the solvent, and normal pressure, i.e., at about 760 mm. Hg abs., insofar as not otherwise stated. The magnesium used according to the following examples is up to 99.98% by weight pure.

*Example 1*

6 g. of p-dibromobenzene was added under nitrogen and with stirring to 104 g. magnesium chips in 100 ml. water-free tetrahydrofuran in 4 liter flask equipped with stirrer, reflux cooler, dropping funnel, thermometer, and gas inlet tube, in order to activate the magnesium. After the reaction between the magnesium and dibromobenzene had gotten under way, as observed by an increase in temperature, a mixture of 1,500 ml. water-free tetrahydrofuran, 489.4 g. p-dibromobenzene 20.3 g. sym. tetramethyldichlorodisiloxane and 258.1 g. dimethyldichlorosilane was added through the dropping funnel while stirring over a period of about 3 hrs. About 4 hrs. after the last of the mixture had been added, the metal was completely consumed and the temperature had descended to room temperature.

600 ml. of water which had been mixed with 2 ml. of concentrated hydrochloric acid was added, while stirring, in small quantities to the mixture thus obtained. Two clear fluid layers were formed. The lower aqueous phase was discarded, the upper, organic layer was neutralized with solid sodium bicarbonate. After filtering and evaporating the solvent, 280 g. (96.8% of the theoretical) of a waxline, light yellow compound was obtained. The product was a polymer composed of blocks of the formula $$—Si(CH_3)_2OSi(CH_3)_2[C_6H_4Si(CH_3)_2]_{p'}C_6H_4—$$

wherein $p'$ is an average of 20. The two valences indicated by dashes could be attached to each other in a ring or, if the molecules were large they could be satisfied by chlorine or bromine atoms.

*Example 2*

Working as in Example 1, 331.7 g. of a dimethylpolysiloxane containing one Si-bonded chlorine atom in each terminal unit and having a chlorine content of 2.14% by weight, was reacted with 116.2 g. of dimethyldichlorosilane, 235.9 g. p-dibromobenzene and 50 g. of magnesium chips in 800 ml. water-free tetrahydrofuran. The reaction mixture thus obtained was also processed as described in Example 1.

415 g. of a honey-like, very viscous fluid was obtained having a molecular weight of 52,500 to 53,000. The product was composed of blocks of the formula $$—[Si(CH_3)_2O]_eSi(CH_3)_2[C_6H_4Si(CH_3)_2]_fC_6H_4—$$

wherein $e$ has an average value of 42 and $f$ has an average value of 9 and the number of these blocks per molecule is an average of 12.

*Example 3*

A 2 g. portion of 141.6 g. p-dibromobenzene was added under nitrogen to 30 g. of magnesium chips in 100 ml. water-free tetrahydrofuran in a 2 liter flask equipped with stirrer, reflux cooler, dropping funnel, thermometer and gas inlet tube with concurrent stirring in order to activate the magnesium. After the reaction between the magnesium and the dibromobenzene had gotten under way, as indicated by an increase in temperature, a mixture of 600 ml. water-free tetrahydrofuran, the remainder of the 141.6 g. of p-dibromobenzene, 77.6 g. vinylmethyl dichlorosilane and 199.1 g. of an alpha-omega-dichlorodimethylpolysiloxane of the type described in Example 2 was added to the mixture through the dropping funnel while stirring during a period of about 1.5 hrs. The mixture thus obtained was then allowed to boil lightly at reflux for another hour and heat was applied when necessary. After this the magnesium metal had fully disappeared.

After the temperature had descended to room temperature, a mass of 250 ml. water mixed with 2 ml. hydrochloric acid was added to the reaction mixture in small portions. Two fluid phases formed, the lower, clear, aqueous layer was discarded and the upper, somewhat turbid, organic layer was neutralized by introducing gaseous ammonia. After the addition of 2,000 ml. benzene the product was washed with 200 ml. water each time, three times in a centrifuge. After distilling off the solvent at 12 mm. Hg, 273 g. (97.8% of the theoretical) of a viscous, wax-like, light-yellow compound was obtained. This compound was a polysilarylenesiloxane containing terminal group of the formula —Si(CH$_3$)$_2$OH and —Si(CH$_3$)(CH=CH$_2$)OH and intermittently recurring organopolysiloxane blocks of the formula —[Si(CH$_3$)$_2$O]$_6$Si(CH$_3$)$_2$— and polysilarylene blocks of the formula

—[C$_6$H$_4$Si(CH$_3$)(CH=CH$_2$)]$_{p''}$C$_6$H$_4$— wherein $p''$ has an average of 9.

*Example 4*

The method described in Example 3 was repeated with the exception that instead of the 77.6 g. of vinylmethyldichlorosilane, 67.7 g. of methyldichlorosilane was used.

256 g. (96.6% of the theoretical) of a hard wax-like, light-yellow material was obtained. This material was a polysilarylenesiloxane of intermittently recurring organopolysiloxane blocks of the formula —[Si(CH$_3$)$_2$O]$_6$Si(CH$_3$)$_2$— and polysilarylene blocks of the formula

—[C$_6$H$_4$SiH(CH$_3$)]$_{p''}$C$_6$H$_4$ containing terminal groups of the formula —Si(CH$_3$)$_2$OH and —SiH(CH$_3$)OH In close agreement with the calculated value, analysis of the product showed a 0.2% by weight content of silicon-bonded hydrogen.

*Example 5*

While Examples 1–4 describe the single stage process, this example describes the 2-stage process. A mixture of 2,000 ml. water-free tetrahydrofuran, 471.8 g. p-dibromobenzene and 245.2 g. of dimethyldichlorosilane was added to 98 g. of magnesium chips in a 4 liter flask as described in Example 1 under nitrogen and while stirring over a period of 3 hours. Then the mixture thus obtained was allowed to boil lightly at reflux for another hour, applying heat when required.

The reaction mixture thus obtained from the first phase was conducted into a dropping funnel after its temperature has descended to room temperature. In the second stage, the product from the first stage was added to 40.6 g. sym.-tetramethyldichlorodisiloxane in 100 ml. of water-free tetrahydrofuran under nitrogen and while stirring during a period of one hour. One hour after end of the addition of the mixture obtained in the first step, 750 ml. water which had been mixed with 5 ml. of concentrated hydrochloric acid was added in small portions while stirring.

Two clear fluid phases formed. The lower aqueous phase was discarded and the upper organic layer was neutralized with solid sodium bicarbonate. After filtering and vaporizing the solvent 267 g. (91% of the theoretical) of a light-yellow, hard wax-like substance was obtained. This substance was a polysilarylenesiloxane with sequences of the formula —Si(CH$_3$)$_2$OSi(CH$_3$)$_2$[C$_6$H$_4$Si(CH$_3$)$_2$]$_{p'''}$
C$_6$H$_4$Si(CH$_3$)$_2$OSi(CH$_3$)$_2$O— where $p'''$ is an average of 19, and containing terminal groups of the formula —Si(CH$_3$)$_2$OH.

All symbols and indices which are not given specifically, have the same value as given above.

That which is claimed is:

1. A method for preparing silarylenesiloxane polymers comprising reacting (I) at least one organasiloxane containing at least two silicon bonded chlorine atoms pre molecule and characterized by units selected from the group consisting of R'$_2$SiO, ClR'$_2$SiO$_{1/2}$, R'SiO$_{3/2}$, ClSiO$_{3/2}$, R'ClSiO, SiO$_2$, Cl$_2$R'SiO, Cl$_2$R'SiO$_{1/2}$, Cl$_3$SiO$_{1/2}$, and R'$_3$SiO$_{1/2}$ and a R'/Si ratio from 1.9/1 to 2.0/1 wherein each R' is selected from the groups consisting of hydrogen atoms, monovalent hydrocarbon radicals and monovalent substituted hydrocarbon radicals wherein the substituents are inert to magnesium, at least 70% of the R' radicals are monovalent hydrocarbon radicals, (II) at least one arylenehalide of the formula XRX where R is an arylene radical, both X's are halogen atoms bonded to R in para-position, (III) at least one chlorosilane of the formula R''$_2$SiCl$_2$ wherein each R'' is a hydrogen atom, a monovalent hydrocarbon radical or a substituted monovalent hydrocarbon radical wherein the substituents are inert to magnesium, at least one R'' in each silane molecule being a monovalent hydrocarbon radical, and (IV) magnesium.

2. The method of claim 1 further characterized in that the reaction product obtained is admixed with water thereby hydrolyzing the product and the hydrolyzate is condensed thereby effecting further polymerization thereof.

3. The method of claim 1 further characterized in the organosiloxane (I) is of the general formula Cl(R'$_2$SiO)$_n$SiR'$_2$Cl where R' is as defined in claim 1 and $n$ is an integer of 1–500.

4. The method of claim 2 further characterized in the organosiloxane (I) is of the general formula Cl(R'$_2$SiO)$_n$SiR'$_2$Cl wherein R' is as defined in claim 1 and $n$ is an integer of 1–500.

5. The method of claim 1 wherein the molar-ratio of arylenehalide (II) to organosiloxane (I) is in the range from 3/1 to 200/1.

6. The method of claim 3 wherein the molar-ratio of arylenehalide (II) to organosiloxane (I) is in the range from 3/1 to 200/1.

7. Method according to claim 1 characterized in that the organodichlorosilanes (III) are incorporated in quantities obtained from the equation $d=p-a$, wherein $d$ is the number of mols of organodichlorosilane (III) $p$ is the number of mols of arylenehalide (II) which are used and $a$ has a value between 0 to twice the number of mols of organosiloxane (I) used inclusive or between 0 and the number of chlorine equivalents which are present in the quantity or organosiloxane (I) inclusive.

8. Method according to claim 1 characterized in that the organodichlorosilanes (III) are incorporated in quantities given by the equation $d=p-z$, wherein $p$ is the number of mols of arylenehalide (II) which are used and $d$ is the number of mols of organodichlorosilanes (III) and $z$ equals the number of mols of organosiloxane (I) which are used or half of the chlorine equivalents present in the organosiloxane (I) which is used.

9. Method according to claim 1 characterized in that the magnesium (IV) is used in a minimum quantity obtained from the equation $m=h/2-b$, wherein $m$ is the number of mols of magnesium (IV), $h$ is the number of halogen equivalents in the reaction components (I), (II), and (III) and $b$ has a value between 0 and $z$.

10. Method according to claim 1 characterized in that during the first stage arylenehalide is reacted with $p-a'$ mol of oragnodichlorosilane and $h/2-b$ mol of magnesium, wherein $p$ is the number of moles of arylenehalide (II) which are used and $b$ has a value between 0 and $z$ and $a'$ is $0.1z$ to $0.5z$ and during the second stage the reaction mixture thus obtained is mixed without previously isolating organic, magnesium-free components with $z$ mols of Si-bonded chlorine atom containing organosiloxane and allowed to react to completion.

11. A polysilarylenesiloxane of a general formula selected from the group consisting of

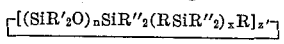

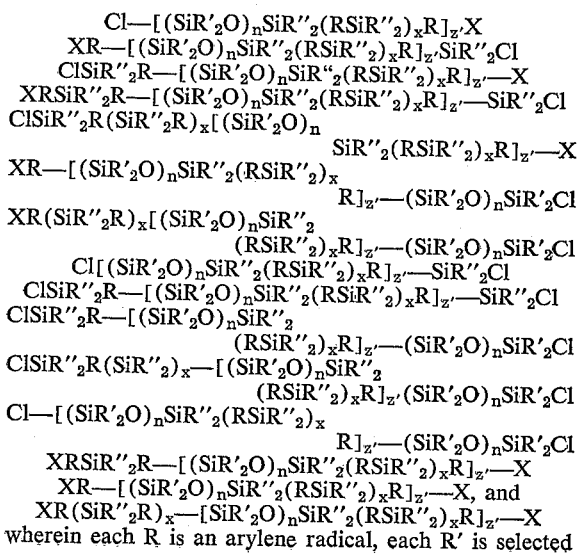

wherein each R is an arylene radical, each R' is selected from the group consisting of hydrogen atoms, monovalent hydrocarbon radicals and monovalent substituted hydrocarbon radicals, wherein the substituents are inert to magnesium, each R" is selected from the group consisting of hydrogen atoms, monovalent hydrocarbon radicals and monovalent substituted hydrocarbon radicals, wherein the substituents are inert to magnesium, X is a halogen atom bonded to R in the para position, at least 70% of the R' radicals are monovalent hydrocarbon radicals, at least one R" per silicon atom is a monovalent hydrocarbon radical, $z'$ is at least 1, $x$ is at least 1 and $n$ is at least 1.

12. The polysilarylenesiloxane in accordance with claim 11 wherein $n$ is 1, $x$ has an average value of 20, R' is methyl, R" is methyl and R is phenylene.

13. The polysilarylenesiloxane in accordance with claim 11, wherein $n$ is 42, $x$ has an average value of 9, $z'$ has an average value of 12, R' is methyl, R" is methyl and R is phenylene.

14. The polysilarylenesiloxane in accordance with claim 12 wherein X is bromine.

15. The polysilarylenesiloxane in accordance with claim 12 wherein the general formula is

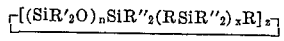

16. The polysilarylenesiloxane in accordance with claim 11 wherein $n$ is from 1 to 500.

References Cited

UNITED STATES PATENTS

| | | |
|---|---|---|
| 3,067,230 | 12/1962 | Silva et al. |
| 3,117,149 | 1/1964 | Holdstock. |
| 3,162,662 | 12/1964 | Brown et al. _____ 260—46.5 |
| 3,209,018 | 9/1965 | Merker. |

FOREIGN PATENTS 503,669  6/1954  Sweden.

DONALD E. CZAJA, *Primary Examiner.*

LEON BERCOVITZ, *Examiner.*

M. I. MARQUIS, *Assistant Examiner.*